United States Patent [19]

Yamazaki et al.

[11] 4,355,875
[45] Oct. 26, 1982

[54] AUTOMATIC DIAPHRAGM CONTROL DEVICE FOR CAMERAS

[75] Inventors: Keiji Yamazaki; Toshio Kobori, both of Sakai, Japan

[73] Assignee: Minolta Camera Kabushiki Kaisha, Osaka, Japan

[21] Appl. No.: 255,493

[22] Filed: Apr. 20, 1981

[30] Foreign Application Priority Data

Apr. 24, 1980 [JP] Japan .................................. 55-53548

[51] Int. Cl.³ ............................................... G03B 9/06
[52] U.S. Cl. ...................................... 354/38; 354/271
[58] Field of Search ................................ 354/38, 271

[56] References Cited

U.S. PATENT DOCUMENTS 4,129,877 12/1978 Yamamichi et al. ................ 354/271
4,142,787 3/1979 Ueda et al. ............................ 354/38

FOREIGN PATENT DOCUMENTS

50-99133 8/1975 Japan .
50-99134 8/1975 Japan .

*Primary Examiner*—Russell E. Adams
*Attorney, Agent, or Firm*—Watson, Cole, Grindle & Watson

[57] ABSTRACT

An automatic diaphragm control device is constructed such that energization of a release electromagnetic causes a release interlock mechanism to simultaneously release diaphragm stop means and a diaphragm operating mechanism. This allows the diaphragm stop means to stop the diaphragm operating mechanism at a position maintaining the diaphragm fully open when a diaphragm control circuit, based on T.T.L light measurement, generates a diaphragm stop signal simultaneously with the energization of the release electromagnet to energize a diaphragm determination electromagnet which in turn releases the diaphragm stop means. In response to termination of an exposure, a reset member directly engages and returns the release interlock mechanism and the diaphragm operating mechanism while returning the diaphragm stop means through the release interlock mechanism. An adjusting member is disposed between a stop lever and an armature lever of the diaphragm stop means for enabling adjustment of the position of the stop lever relative to the armature lever. This adjustment makes it possible to minimize the time lag from the generation of the diaphragm stop signal till the actual stoppage of the diaphragm operating mechanism. Another adjusting member is disposed between the stop lever and the release interlock mechanism for enabling adjustment of the amount of overcharge of the stop lever which occurs with the release interlock mechanism having been returned by the reset member.

13 Claims, 4 Drawing Figures

AUTOMATIC DIAPHRAGM CONTROL DEVICE FOR CAMERAS

BACKGROUND OF THE INVENTION

1. Field of the Invention

The present invention relates to an automatic diaphragm control device for a camera, and more particularly to a device which ensures automatic correct diaphragm control to a fully open aperture.

2. Description of Prior Art

There has been proposed an automatic diaphragm control device in which, when a diaphragm operating mechanism reaches a position for setting a diaphragm to an optimum aperture size, a diaphragm stop signal is generated to actuate an electromagnetic means, which causes stop means to engage the diaphragm operating mechanism for stopping the movement of the mechanism. However, a variety of factors make it difficult for this type of diaphragm control device to control the diaphragm correctly to a fully open aperture. For example, the stop means is normally retained by the diaphragm operating mechanism and remains inoperative until the diaphragm operating mechanism starts movement in response to a shutter release operation. As a result, when a diaphragm stop signal is generated with the diaphragm operating mechanism being at the initial position corresponding to a fully open aperture, the stop means is actually actuated after the diaphragm operating mechanism has moved to a slight extent, whereby the diaphragm is set to an aperture which is slightly smaller than the fully open aperture.

A similar problem may occur when the stop means retained at its reset position by the electromagnetic means, is spaced an unnecesarily long distance from the diaphragm operating mechanism because of errors in shape and dimensions of the stop means or an erroneous mounting of the stop means and the electromagnetic means on a fixed portion of a camera. In the diaphragm control device, moreover, the stop means is divided into two members which are connected with a couping spring so that any overcharge thereof, i.e. tensioning of the spring caused by relative displacement of the two members with one of two members exceeding its reset position, can be allowed when, it is reset by a reset mechanism in response to an exposure completion signal or a film advance and shutter cocking operation. If, however, there are errors, in shape and dimensions of the two members, play occurs between the two members in their reset conditions, a slight time delay occurs before the two members start movement integrally as one stop means in response to actuation of the electromagnetic means. In this case, it is similarly difficult to set the diaphragm correctly to the fully open aperture.

SUMMARY OF THE INVENTION

It is an object of the present invention to provide an automatic diaphragm control device which is free from the abovementioned problems and which enables highly accurate diaphragm control to any aperture size.

Another object of the present invention is to provide an automatic diaphragm control device which enables highly accurate diaphragm control at a fully open aperture by adjusting operation of adjusting members.

To accomplish these objects, an automatic diaphragm control device of the present invention is constructed such that both diaphragm stop means and a diaphragm operating mechanism are simultaneously released from their retention by release interlock means, in response to actuation of release electromagnetic means which is caused by a camera actuating operation. Thereafter, the diaphragm operating mechanism stops down a diaphragm while the diaphragm stop means is restrained only by diaphragm determination electromagnetic means. A diaphragm control circuit, which is adapted to be made operative by the camera actuating operation calculates from scene brightness measured through an objective and an diaphragm aperture formed by the diaphragm, set film sensitivity and selected shutter speed and actuates the diaphragm determination electromagnetic means for releasing the diaphragm stop means when the diaphragm is stopped down to an aperture size which is optimum for the scene brightness, the set film sensitivity and the selected shutter speed. Thus if the scene brightness requires the diaphragm to be maintained at the fully open aperture, the diaphragm control circuit actuates the diaphragm determination electromagnetic means simultaneously with the actuation of the release electromagnetic means, and accordingly the diaphragm stop means can stop the diaphragm operating mechanism at a position maintaining the diaphragm fully open.

According to a preferred embodiment of the present invention, a reset means directly engages and returns the release interlock means and the diaphragm operating mechanism in response to termination of an exposure while at the same time returning the diaphragm stop means through the release interlock means. Cocking means cocks the reset means in response to a film advance and shutter cocking operation, retracting the reset means from the diaphragm operating mechanism and the release interlock means, which are in turn restrained at their reset positions by the release interlock means and the release electromagnetic means respectively. At that time, the diaphragm stop means is also retained at its reset position by the release interlock means.

The diaphragm stop means includes a stop lever engageable with the diaphragm operating mechanism, an armature lever arranged coaxially with the stop lever and supporting an armature of the diaphragm determination electromagnetic means, a coupling spring resiliently coupling the stop lever and the armature lever as a unit and a drive spring biasing these two levers in the direction for retracting the armature from the core or magnetic pole and for enabling the stop lever to engage the diaphragm operating mechanism. An eccentric pin is carried on one of the two levers for enabling adjustment of the position of the stop lever relative to the armature lever at the time when the armature is restrained on the core by the magnetic force produced by a permanent magnet of the diaphragm determination electromagnetic means. This adjustment makes it possible to minimize the time lag from the actuation of the diaphragm determination electromagnetic means, i.e. energization of a coil of the electromagnetic means, to the actual stoppage of the diaphragm operating mechanism, i.e. the engagement of the stop lever with the diaphragm operating mechanism. Another eccentric pin is carried on the stop lever so as to be pushed by the release interlock means upon the return or restoring of the release interlock means by the reset means. Rotation of this eccentric pin makes it possible to adjust the amount of overcharge of the stop lever and the coupling spring with the release interlock means having been returned or restored by the reset means.

The above and other objects and features of the present invention will become more apparent from the following description of a preferred embodiment taken in conjunction with the accompanying drawings.

DETAILED DESCRIPTION OF A PREFERRED EMBODIMENT

Figure 1:
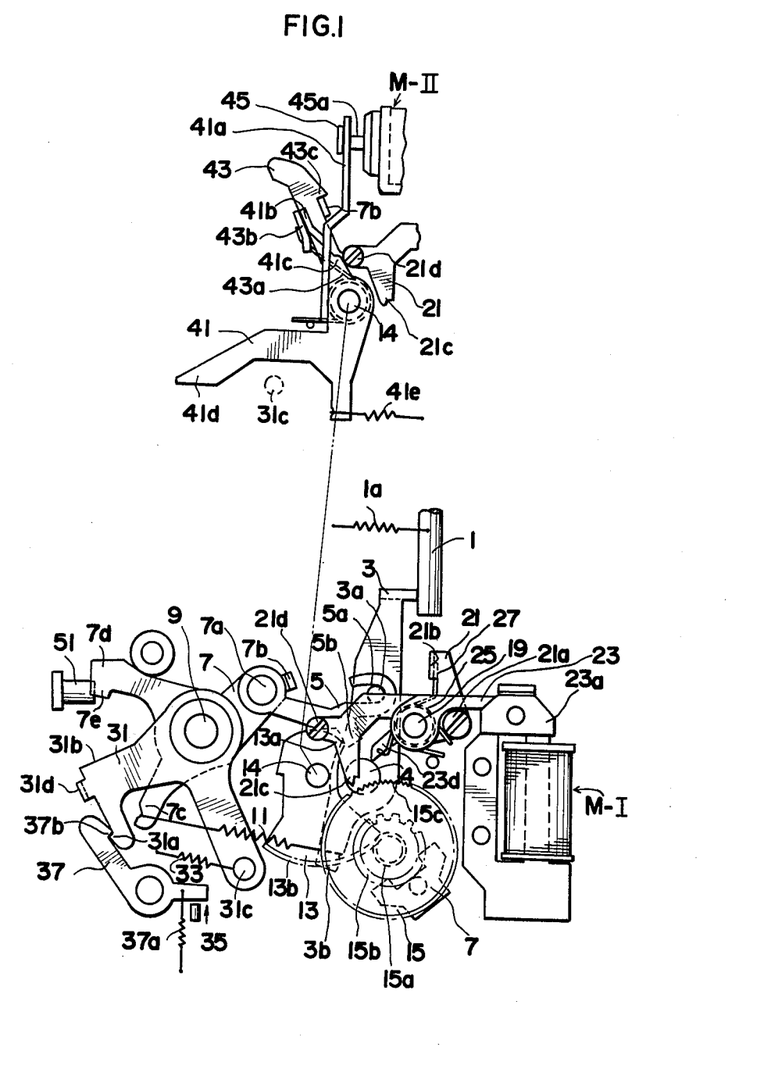
FIGS. 1 to 3 are schematic illustrations showing an arrangement of a diaphragm control mechanism according to an embodiment of the present invention, wherein the diaphragm control mechanism is shown in a condition after a film advance and shutter cocking operation and prior to a shutter release operation in FIG. 1, in a condition after determination of a diaphragm aperture and prior to termination of an exposure in FIG. 2 and in a condition after termination of an exposure and prior to a film advance and shutter cocking operation in FIG. 3, respectively, and wherein the members shown in the upper part of the Figures are actually disposed above the members shown in the lower part of the Figures.

With reference to FIG. 1, which shows a diaphragm control mechanism according to the present invention, diaphragm control lever (diaphragm setting member) 3 is rotatably mounted on shaft 4 and continuously engaged by diaphragm interlocked pin 1 which is interlocked with a diaphragm mechanism in an exchangeable lens (not shown). It should be noted that diaphragm interlocked pin 1 is biased by spring 1a in the direction to stop down the diaphragm. Diaphragm control lever 3 is provided with pin 3a which is received in U-shaped slot 5a of first interconnecting lever 5. Second interconnecting lever 7, which is rotatably mounted on shaft 9, is linked with first interconnecting lever 5 by pin 7a carried on second interconnecting lever 7 so that both the first and second interconnecting levers are rotatable together. Second interconnecting lever 7 is provided with arresting projection 7b which is arrested by release lock lever 43 to latch the entire diaphragm control mechanism at its reset or charged position to be described later. Also provided thereon is arm 7c to which one end of spring 11 is connected with the other end thereof connected to arm 3b of diaphragm control lever 3. Thus, a loop motion mechanism is composed of diaphragm control lever 3, first interconnecting lever 5, second interconnecting lever 7, spring 11 and two shafts 4 and 9. For more detailed understanding of such a loop motion mechanism, reference may be made to, for example, U.S. Pat. Nos. 3,810,216, 3,891,992 and 4,142,787. Meanwhile, arm 7d of second interconnecting lever 7 is engageable with reset lever 31 to be described later.

First interconnecting lever 5 is provided with projection 5b which engages abutting end 13a of sector gear 13 rotatably mounted on shaft 14. Gear portion 13b of sector gear 13 is meshed with gear portion 15a of diaphragm determining gear 15. Integrally and coaxially with gear 15 is gear 15b which is engaged by anchor 17 for delaying the rotation of diaphragm determinating gear 15 and thus rotation of sector gear 13. Diaphragm stop gear or ratchet wheel 15c which is engaged by stop lever 21 to be described later is also provided on the circumference of diaphragm determining gear 15. It is to be noted that sector gear 13 is biased clockwise by a spring (not shown). It is to be understood that the loop motion mechanism sector gear 13 and gears 15, 15b and 15 c together constitute a diaphragm operating mechanism.

Electromagnetic means M-1 is of a combination type which contains a permanent magnet within its magnetic circuit to normally attract an armature 23a on its core or magnetic pole by the magnetic force of the permanent magnet, which is counteracted by the magnetic force caused by energization of a magnetic coil, allowing armature 23a to move from the core under the action of spring 27. For better understanding of the combination type electromagnetic means as used herein, reference should be made to U.S. patent application Ser. No. 119,775 which has been allowed. Stop lever 21 and armature lever 23 are pivotally mounted on shaft 19, and furthermore, coupling spring 25 wound around shaft 19 is bridged across arm 23d of armature lever 23 and eccentric adjusting pin 21a formed on stop lever 21 to thereby operate levers 21 and 23 as a unit. In addition, drive spring 27 is mounted with one end engaging vertically extending portion 21b of stop lever 21 and the other end engaging a stationary portion of a camera body so that armature lever 23 and stop lever 21 are integrally rotated counterclockwise when the coil of electromagnetic means M-1 is energized as mentioned above. Stop lever 21 has claw 21c engageable with gear 15c and carries adjusting pin 21d.

Reset lever 31, biased clockwise by spring 33, is rotatably supported by shaft 9. In response to termination of an exposure, exposure termination signaling lever 35 moves upwards to rotate lock lever 37 counterclockwise against the action of spring 37a, whereby detent portion 31a of reset lever 31 is released from lock portion 37b of lock lever 37. This allows reset lever 31 to be rotated clockwise under the action of spring 33 acting on pin 31c. End 31b of reset lever 31 is engageable with projecting portion 7e of second interconnecting lever 7 when reset lever 31 is rotated clockwise. Provided also on reset lever 31 is upstanding tab 31d engageable with mirror reset lever 51.

Figure 2:
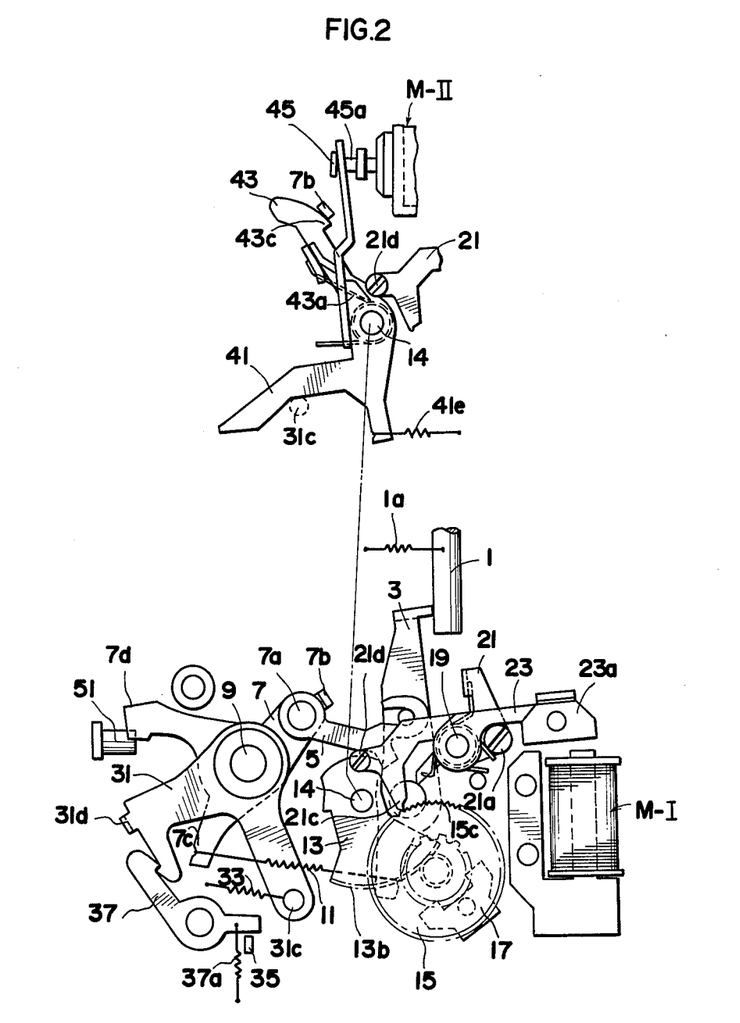
Figure 3:
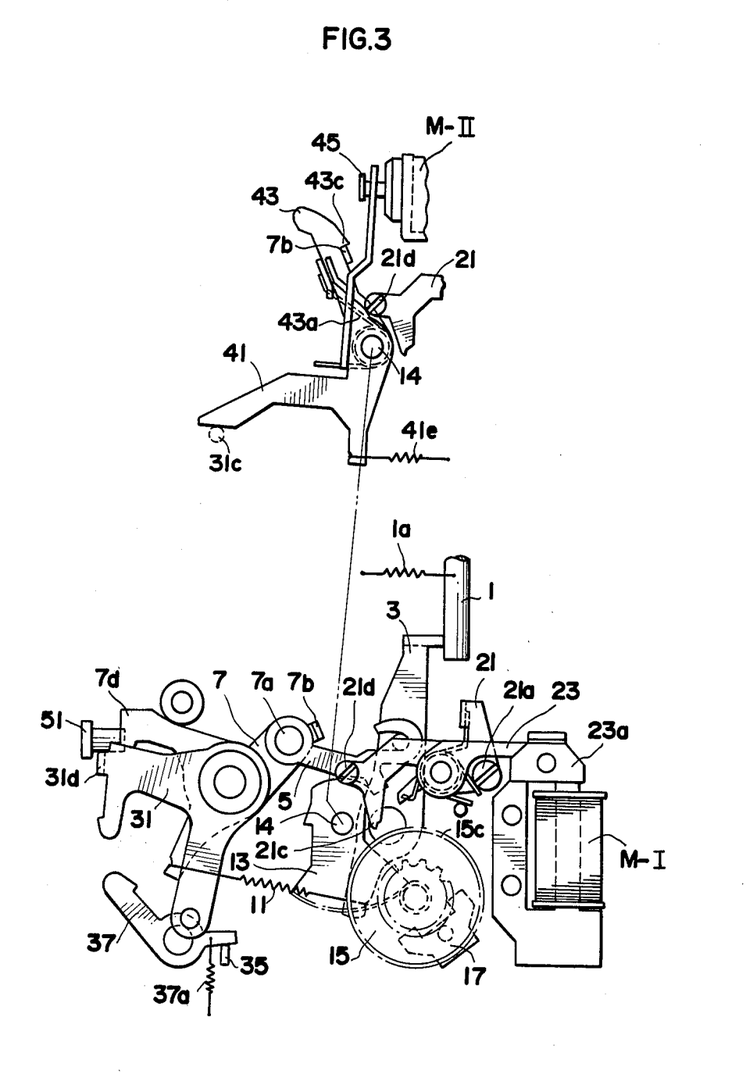

The mechanism shown in the upper part of FIGS. 1 to 3 is located above and overlies the mechanism shown in the lower part of the same Figures. Release interlock lever 41 and release lock lever 43 are rotatably mounted on shaft 14 coaxially with sector gear 13. Levers 41 and 43, a coupling spring 43a and a drive spring 41e together constitute release interlock means. Release electromagnetic means M-II, only part of which is shown in FIGS. 1 to 3, is provided with plunger 45 which projects out of a bobbin when a coil is energized. Plunger 45 is formed with circular groove 45a which is engaged by U-shaped or forked end 41a of release interlock lever 41. The width of groove 45a is designed to permit relative movement of U-shaped end 41a to plunger 45 when release interlock lever 41 is overcharged.

Release interlock lever 41 is further provided with release tab 41b which engages tab 43b of release lock lever 43, abutting edge 41c which is engageable with adjusting pin 21d of stop lever 21, and reset end portion 41d which is engageable with pin 31c of reset lever 31 when lever 31 is rotated clockwise. Lever 41 is biased counterclockwise by drive spring 41e.

Release lock lever 43 is biased clockwise by coupling spring 43a, with its upstanding tab 43b being in constant contact with release tab 41b of release interconnecting lever 41. Lock portion 43c is engageable with arresting projection 7b of second interconnecting lever 7.

Figure 4:
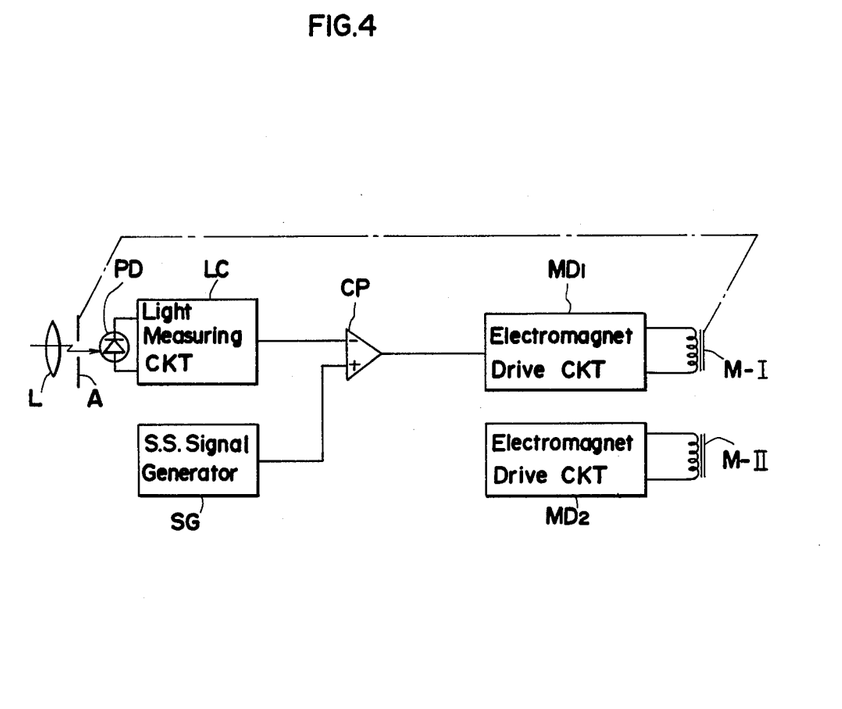
FIG. 4 is a diagrammatical illustration of circuitry for actuating release electromagnetic means and diaphragm determination electromagnetic means.

Referring to FIG. 4 which diagrammatically shows circuitry for actuating electromagnetic means M-I and M-II, light measuring circuit LC includes photodiode PD receiving scene light through objective lens L and diaphragm aperture A of the exchangeable lens and produces a voltage signal proportional to the intensity of the scene light. Light measuring circuit LC further includes an exposure calculation circuit which from the voltage signal and a signal commensurate with a set film sensitivity generates an output voltage representative of an exposure time determined by the three exposure parameters, i.e., the scene light intensity or scene light brightness, the size of diaphragm aperture A, and the set film sensitivity. The output voltage of light measuring circuit LC has a linear relationship with the logarithm of the scene brightness, wherein the higher the output voltage, the higher the scene brightness. Shutter speed signal generator SG generates an output voltage representative of a selected shutter speed. Voltage comparator CP compares the voltage levels of the output voltages from light measuring circuit LC and shutter speed signal generator SG and produces a "low" (logic "0") level voltage when the output voltage from light measuring circuit LC is higher than that from shutter speed signal generator SG while producing a "high" (logic "1") level voltage when the output voltage from shutter speed signal generator SG is higher than that from light measuring circuit LC. The logic "1" signal generated from voltage comparator CP is a diaphragm stop signal. The output of voltage comparator CP is connected to the input of electromagnet drive circuit $MD_1$, so that circuit $MD_1$ energizes the coil of electromagnetic means M-I by a pulsive current upon receipt of a logic "1" signal from voltage comparator CP when a release switch (not shown) has been closed. Light measuring circuit LC, shutter speed signal generator SG, voltage comparator CP and electromagnet drive circuit together constitute a diaphragm control or determination circuit. The release switch is closed when a shutter button (not shown) is depressed to its second stage. It should be noted that, with the shutter button is depressed to its first stage, a power switch (not shown) is closed to actuate light measuring circuit LC, shutter speed signal generator SG, and voltage compator CP. The closure of the release switch also causes electromagnetic drive circuit $MD_2$ to energize the coil of electromagnetic means M-II by a pulsive current.

The operation of the embodiment is as follows. When the shutter button is depressed to its first stage, light measuring circuit LC, shutter speed signal generator SG and voltage comparator CP are actuated. When the shutter button is further depressed to its second stage, electromagnet drive circuit $MD_2$ energizes the coil of electromagnetic means M-II, so that the magnetic force caused by the energization of the coil counteracts the magnetic force of the permanent magnet of the electromagnetic means M-II, whereby plunger 45 is freed and release interlock lever 41 is rotated counterclockwise under the action of spring 41e to retract to the position shown in FIG. 2. Then, abutting edge 41c is retracted from eccentric pin 21d and at the same time release lock lever 43 is rotated counterclockwise against the action of spring 43a through engagement between tab 41b of release interlock lever 41 and tab 43b of release lock lever 43, thereby releasing arresting projection 7b from lock portion 43c. With arresting projection 7b thus released, diaphragm control lever 3 is driven counterclockwise by spring 11 of the loop motion mechanism by way of second interconnecting lever 7 and first interconnecting lever 5.

Diaphragm interlock pin 1 follows diaphragm control lever 3 under the action of spring 1a, whereby the diaphragm stopping-down operation begins with the diaphragm aperture gradually reduced. At this time, the counterclockwise rotation of diaphragm control lever 3 forces sector gear 13 to rotate counterclockwise, through projection 5b of first interconnecting lever 5, whereby sector gear 13 rotates diaphragm determining gear 15. The rotation of diaphragm determining gear 15 is retarded by the cooperation of anchor 17 and gear 15b.

Photodiode PD receives scene light through objective lens L and diaphragm aperture A which is being reduced. When the level of the output voltage of light measuring circuit LC becomes lower than that of the output voltage of shutter speed signal generator SG, voltage comparator CP generates a logic "1" signal, i.e., a diaphragm stop signal, which in turn causes electromagnet drive circuit $MD_1$ to energize the coil of electromagnetic means M-I, whereby the magnetic force caused by the energization of the coil counteracts the magnetic force of the permanent magnet of electromagnetic means M-I.

As described above, adjusting pin 21d on stop lever 21 is freed as a result of the counterclockwise rotation of interconnecting lever 41, whereby stop lever 21 is rotatable counterclockwise along with armature lever 23 under the action of spring 27. When, therefore, the coil of electromagnetic means M-I is energized, claw 21c of stop lever 21 immediately engages gear 15c so that diaphragm determining gear 15 stops rotating. As a result, diaphragm control lever 3 stops rotating, causing diaphragm interlocked pin 1 to immediately stop its following movement, so that the diaphragm aperture is determined.

Meanwhile, when the level of the output voltage of light measuring circuit LC is lower than that of the output voltage of shutter speed signal generator SG at the time the release switch is closed, electromagnet drive circuits $MD_1$ and $MD_2$ simultaneously energize the coils of electromagnetic means M-I and M-II, respectively. Accordingly, at the same time second interconnecting lever 7 and thus the entire loop motion mechanism is released from the reset or charged condition to initiate the stopping-down operation of the diaphragm, claw 21a of stop lever 21 engages gear 15c, whereby the diaphragm is stopped at its fully open aperture.

Rotation of eccentric adjusting pin 21a carried on stop lever 21 adjust the space between claw 21c and gear 15c with armature 23a held on the core of electromagnetic means M-I, thereby minimizing the time loss or the lag related to the diaphragm stop operation. That is, stop lever 21 can be rotated counterclockwise by suitable rotation of eccentric adjusting pin 21a upon assembling of the diaphragm control mechanism, with armature lever 23 maintained stationary relative to the core of electromagnetic means M-I. Furthermore, adjusting pin 21d may be rotated to adjust the position where pin 21d abuts against edge 41c of release interlock lever 41 such that release interlock lever 41 can push pin 21d and can press armature 23a against the core of electromagnetic means M-I during the return or restoring operation of the diaphragm control mechanism. It is to be understood that this adjustment by rotation of eccentric pin 21d results in the adjustment of the amount of overcharge of stop lever 21 and coupling spring 25.

With a diaphragm aperture thus determined, a mirror is then lifted, and shutter release operation is performed in a known manner.

The returning or restoring operation of the diaphragm control mechanism to its reset position after completion of exposure is as follows. Exposure termination signaling lever 35 moves upwards in response to termination of an exposure, i.e., completion of a trailing shutter curtain travel, whereby lock lever 37 is rotated counterclockwise against the action of spring 37a to release detent portion 31a of reset lever 31. As a result, reset lever 31 is rotated clockwise about shaft 9 under the action of spring 33. Upstanding tab 31d of reset lever 31 engages and pushes mirror reset lever 51, causing the movable mirror to return. At the same time, end surface 31b of reset lever 31 engages and pushes projecting portion 7e of second interconnecting lever 7 under the action of spring 33, causing second interconnecting lever 7 to be rotated clockwise. At this time, second interconnecting lever 7 rotates first interconnecting lever 5, spring 11 and diaphragm control lever 3, all of which form the loop motion mechanism, thereby returning them to their reset positions shown in FIG. 3. During the returning operation, pin 31c carried on reset lever 31 pushes reset end portion 41d of release interlock lever 41, which is then rotated clockwise about shaft 14 against the action of spring 41a, thereby retracting U-shaped end 41a from the large diameter head of plunger 45. As a result, plunger 45 is attracted by the magnetic force of the permanent magnet back into the bobbin of electromgnetic means M-II with a slight gap left between its large diameter head and U-shaped end 41a of release interlock lever 41. In the meantime, abutting edge 41c of release interlock lever 41 pushes adjusting pin 21d of stop lever 21 so that stop lever 21 and armature lever 23 are rotated clockwise about shaft 19, whereby claw 21c of stop lever 21 is disengaged from gear 15c and armature 23a is pressed against the core of diaphragm stop electromagnetic means M-I with stop lever 21 and spring 27 overcharged, forming a gap between pin 21a and armature lever 23. The amount of the overcharge at this time is adjustable by rotation of eccentric adjusting pin 21d and, in fact, the overcharge is necessitated to ensure the complete reset of armature 23a onto the core of electromagnetic means M-I.

When release tab 41b of release interlock lever 41 is retracted by the clockwise rotation thereat, release lock lever 43 is rotated clockwise under the action of spring 43a following release tab 41b. Arresting projection 7b of second interconnecting lever 7 is engaged again with lock portion 43a of release lock lever 43.

Diaphragm interlocked pin 1 of the exchangeable lens is reset to its initial position against the action of spring 1a as a result of the return of diaphragm control lever 3, thereby causing the diaphragm to be fully opened.

With the film advanced and with the shutter cocked for subsequent photography, a charging or tensioning mechanism (not shown) rotates reset lever 31 counterclockwise about shaft 9 through pin 31c against the action of spring 33, thereby causing lock portion 31a to engage lock portion 37b or lock lever 37. As pin 31c is retracted from reset end portion 41d due to the counterclockwise rotation of reset lever 31, release interlock lever 41 is freed and slightly rotated counterclockwise, which is followed by slight counterclockwise rotation of stop lever 21 under the action of spring 25 which has been overcharged. Thus, the overcharge of stop lever 21 and spring 25 is released. It should be noted that release interlock lever 41 stops its counterclockwise rotation when its U-shaped end 41a abuts on the large diameter head of plunger 45 of electromagnetic means M-II.

With this operation performed, all the mechanisms are returned to their initial condition shown in FIG. 1.

Thus, according to the above described embodiment, release electromagnetic means M-II is actuated by a signal in relation to a release operation. This allows actuation of stop lever 21 even at the very moment of the release of the diaphragm operating mechanism from its reset or charged condition. When, therefore, a diaphragm stop signal is applied to diaphragm stop electromagnetic means M-I, the diaphragm aperture (even a fully open aperture) is immediately determined. In addition, the rotational adjustment of eccentric adjusting pin 21a makes it possible to change the relative position of stop lever 21 to armature lever 23. Thus, this enables fine adjustment of a space between claw 21c and gear 15c and therefore a time loss or a time lag from the generation of a diaphragm stop signal until the actual determination of the diaphragm can be minimized, whereby the diaphragm can be automatically controlled with high accuracy. In addition, the rotational adjustment of eccentric adjusting pin 21d also ensures the complete reset of armature 23a onto the core of diaphragm stop electromagnetic means M-I, and makes the relative position between armature 23a and stop lever 21 adjustable to an ideal extent when combined with the rotational adjustment of eccentric adjusting pin 21a.

What is claimed is:

1. An automatic diaphragm control device for a camera which includes an exchangeable lens having an objective, a diaphragm and a diaphragm interlock member interlocked with said diaphragm to move therewith, said device comprising:
    a diaphragm operating mechanism interlocked with said diaphragm interlock member and movable from a reset position to an operating position for stopping-down said diaphragm through said diaphragm interlock member;
    diaphragm stop means movable from a reset position to an operating position and including a stop lever engaging said diaphragm operating mechanism to stop the latter mechanism with said diaphragm stop means being at the operating position and said stop lever being retracted from said diaphragm operating mechanism with said diaphragm stop means at the reset position;
    diaphragm determination electromagnetic means capable of restraining said diaphragm stop means at the reset position and releasing said diaphragm stop means upon actuation thereof;
    a light measuring circuit for measuring scene brightness through said objective and said diaphragm which is being stopped-down by said diaphragm operating mechanism through said diaphragm interlock member and generating a light measurement signal which varies with the stopping-down of said diaphragm;

a reference signal generator for generating a reference signal to be compared with said light measurement signal;

means for comparing said light measurement signal with said reference signal to generate a diaphragm stop signal for actuating said diaphragm determination electromagnetic means when said light measurement signal represents a given relationship with respect to said reference signal;

release interlock means movable from a reset position for restraining both said diaphragm operating mechanism and said diaphragm stop means at the respective reset positions thereof to an operating position to release both said diaphragm operating mechanism and said diaphragm stop means to allow simultaneous movement thereof from said reset positions to said operating positions;

release electromagnetic means capable of restraining said release interlock means at the reset position and releasing said release interlock means upon actuation thereof; and circuit means for actuating said release electromagnetic means in response to a camera actuating operation.

2. An automatic diaphragm control device as defined in claim 1, further comprising;

reset means movable from a cocked position to a reset position for returning said release interlock means, said diaphragm operating mechanism and said diaphragm stop means to the reset positions thereof in response to termination of an exposure; and means for cocking said reset means in response to a film advance and shutter cocking operation.

3. An automatic diaphragm control device as defined in claim 2, wherein said diaphragm determination electromagnetic means includes a core, an armature, a permanent magnet producing a magnetic force for attracting said armature to said core, and a coil energizable by said diaphragm stop signal for the actuation of said diaphragm determination electromagnetic means, producing a magnetic force counteracting said magnetic force produced by said permanent magnet, and wherein said diaphragm stop means further includes an armature lever supporting said armature and arranged coaxially with said stop lever, a coupling spring resiliently coupling said both levers as a unit, a drive spring biasing said both levers in a direction for causing said stop lever to engage said diaphragm operating mechanism as well as for causing said armature lever to retract said armature from said core, said armature being held on and retracted from said core with said diaphragm stop means at said reset position and said operating position, respectively.

4. An automatic diaphragm control device as defined in claim 3, wherein said reset means is adapted to abut with said release interlock means and said diaphragm operating mechanism for return to said reset positions and said release interlock means is adapted to abut with said diaphragm stop means for causing the return thereof to said reset position upon return to the reset position by said reset means, said diaphragm stop means being restrained at the reset position through abutment with said release interlock means.

5. An automatic diaphragm control device as defined in claim 4, further comprising a first adjusting member carried on either said stop lever or said armature lever and adjustable to adjust the position of said stop lever relative to said armature lever with said armature being held on said core and with said armature lever being stationary relative to said core.

6. An automatic diaphragm control device as defined in claim 5, further comprising a second adjusting member carried on either said stop lever or said release interlock means to be capable of abutting with the other of said stop lever or said release interlock means and adapted for adjustment of the position where said second adjusting member abuts with said the other of said stop lever or said release interlock means with said stop lever and said coupling spring overcharged, wherein said release interlock means is adapted to be returned by said reset means beyond the reset position so that said stop lever and said coupling spring are overcharged through the abutment between said second adjusting member and the other of said stop lever or said release interlock means with said armature being held on said core and with said armature lever being stationary relative to said core.

7. An automatic diaphragm control device as defined in claim 6, wherein said release electromagnetic means includes a plunger movable from a first position to a second position upon the actuation of said release electromagnetic means, and wherein said release interlock means is interlocked with said plunger to move from a reset position to an operating position thereof in response to the movement of said plunger from said first position to said second position.

8. An automatic diaphragm control device as defined in claim 7, wherein said release interlock means includes a rotatable release lock lever capable of locking said diaphragm operating mechanism at the reset position thereof with said release interlock means at the reset position, a rotatable release interlock means interlocked with said plunger and arranged coaxially with said release lock lever, a second coupling spring resiliently coupling said release lock and release interlock levers as a unit, and a second drive spring biasing said release lock and release interlock levers such that said release interlock means as a whole moves toward the operating position thereof, said release interlock lever being adapted to be overcharged by said reset means beyond said reset position with said release lock lever locking said diaphragm operating mechanism and with said second coupling spring being overcharged, and either said release interlock lever or said stop lever carrying said second adjusting member thereon such that said stop lever and said first coupling spring are overcharged by the overcharge of said release interlock lever beyond the reset position thereof.

9. An automatic diaphragm control device as defined in claim 8, wherein said plunger has a large diameter head and a circular grooved portion adjacent to said head portion, and wherein said release interlock lever has a forked portion loosely fitting within said circular grooved portion of said plunger, said forked portion being in abutment with and slightly spaced from said head portion of said plunger at said first position, with said release interlock lever being at said reset position and at said overcharged position respectively.

10. An automatic diaphragm control device as defined in claim 9, wherein said release interlock lever is adapted to return to said reset position from said overcharged position under the action of said second drive spring when said reset means is cocked by said cocking means in response to a film advance and shutter cocking operation, the return of said release interlock lever from said overcharged position to said reset position being followed by that of said stop lever whereby the overcharge of said stop lever, said release interlock lever and said first and second coupling springs are released.

11. An automatic diaphragm control device as defined in claim 1, wherein said diaphragm operating mechanism includes a diaphragm control lever interlocked with said diaphragm interlock member so that the latter follows the movement of the former, a diaphragm determining gear engageable with said stop lever and means arranged between said diaphragm control lever and said diaphragm determining gear for increasing the rotational speed of said diaphragm determining gear relative to that of said diaphragm control lever.

12. An automatic diaphragm control device as defined in claim 11, wherein said diaphragm operating mechanism further includes means for retarding the rotation of said diaphragm determining gear.

13. An automatic diaphragm control device as defined in claim 1, wherein said reference signal generator generates a signal indicative of a preselected shutter speed as said reference signal and said light measuring circuit introduces information of a set film sensitivity so that said light measurement signal is indicative of a shutter speed optimum for the scene brightness measured through said diaphragm being stopped-down and the set film sensitivity.

* * * * *